United States Patent
Kim et al.

(10) Patent No.: US 7,179,563 B2
(45) Date of Patent: Feb. 20, 2007

(54) BINDER FOR A LITHIUM-SULFUR BATTERY, POSITIVE ACTIVE MATERIAL COMPOSITION COMPRISING SAME AND LITHIUM-SULFUR BATTERY USING SAME

(75) Inventors: Seok Kim, Incheon (KR); Yongju Jung, Suwon (KR); Ji-Seong Han, Suwon (KR); Jan-Dee Kim, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 484 days.

(21) Appl. No.: 10/614,870

(22) Filed: Jul. 9, 2003

(65) Prior Publication Data

US 2004/0009399 A1    Jan. 15, 2004

(30) Foreign Application Priority Data

Jul. 10, 2002    (KR) ............... 10-2002-0040006

(51) Int. Cl.
*H01M 4/62*    (2006.01)
(52) U.S. Cl. ............ 429/218.1; 429/232; 429/217; 252/182.1
(58) Field of Classification Search ............ 429/218.1, 429/232, 217; 252/182.1
See application file for complete search history.

(56) References Cited

U.S. PATENT DOCUMENTS 6,773,838 B2 *  8/2004  Suzuki et al. ............ 429/218.1
2003/0143462 A1 * 7/2003  Han et al. ................ 429/218.1

FOREIGN PATENT DOCUMENTS

| EP | 0 848 435 A1 | 8/1996 |
| KR | 10 1999 0028977 A | 1/1998 |
| KR | 10 2002 0011562 A | 8/2002 |
| KR | 10-2002-0068783 A | 8/2002 |

* cited by examiner

*Primary Examiner*—Laura Weiner
(74) *Attorney, Agent, or Firm*—H.C. Park & Associates, PLC

(57) ABSTRACT

Disclosed is a binder for a lithium-sulfur battery including a butadiene-based copolymer. The binder exhibits chemical resistance to polysulfides, is stable a battery working temperatures, forms an emulsion in organic solvents and exhibits high adherence to positive active materials and electrodes used in the lithium-sulfur battery. The disclosed binder compositions, due to their high adherence to positive active materials allow for higher relative amounts of positive active materials to be used in the battery resulting in a high capacity lithium-sulfur battery.

12 Claims, 2 Drawing Sheets

BINDER FOR A LITHIUM-SULFUR BATTERY, POSITIVE ACTIVE MATERIAL COMPOSITION COMPRISING SAME AND LITHIUM-SULFUR BATTERY USING SAME

CROSS REFERENCE TO RELATED APPLICATION

This application claims the benefit of Korean Patent Application No. 2002-40006 filed in the Korean Intellectual Property Office on Jul. 10, 2002, which is hereby incorporated by reference in its entirety for all purposes as if fully set forth herein.

FIELD OF THE INVENTION

The present invention relates to a binder for a lithium-sulfur battery, a positive active material composition comprising the same and a lithium-sulfur battery comprising the same, and more particularly, to a binder for a lithium-sulfur battery exhibiting good adhesion.

BACKGROUND OF THE INVENTION

The rapid development of smaller, lighter, and higher performance electronic and communication equipment has required the development of high performance and large capacity batteries to power such equipment. Lithium-sulfur batteries are of interest because they have the highest theoretical energy density, 2800 Wh/kg (1675 mAh/g), as compared to other batteries. In addition, sulfur is an abundant and inexpensive material, and is also environmentally friendly.

The choice of a binder is critical for determining battery performance. A binder is typically used to adhere positive active materials of the battery to each other and for subsequent adherence on a current collector or electrode. The requirements for the binder typically include chemical resistance to polysulfides; an ability to enhance the mechanical integrity of the positive electrode; stability at battery working temperatures; solubility in organic solvents used in slurry; insolubility in electrolytes; and high adherence properties to sulfur containing positive active materials of the battery.

Except for the high adherence, these physical properties have a significant effect on battery performance. Some materials satisfy such physical properties except for having high adherence, so a binder using these materials will have relatively low adherence.

SUMMARY OF THE INVENTION

Accordingly, the present invention is directed to a binder for a lithium-sulfur battery, a positive active material composition including the binder, and a lithium-sulfur battery using the binder that substantially obviates one or more of the problems due to limitations and disadvantages of the related art. Certain embodiments of the present invention are directed to a butadiene-based copolymer and variations of a butadiene based copolymer that can be used as a binder for various components, and elements for a lithium-sulfur battery.

BRIEF DESCRIPTION OF THE DRAWINGS

The accompanying drawings, which are included to provide a further understanding of the invention and are incorporated in and constitute a part of the specification, illustrate embodiments of the invention and together with the description, serve to explain the principles of the invention.

DETAILED DESCRIPTION OF THE INVENTION

Figure 1:
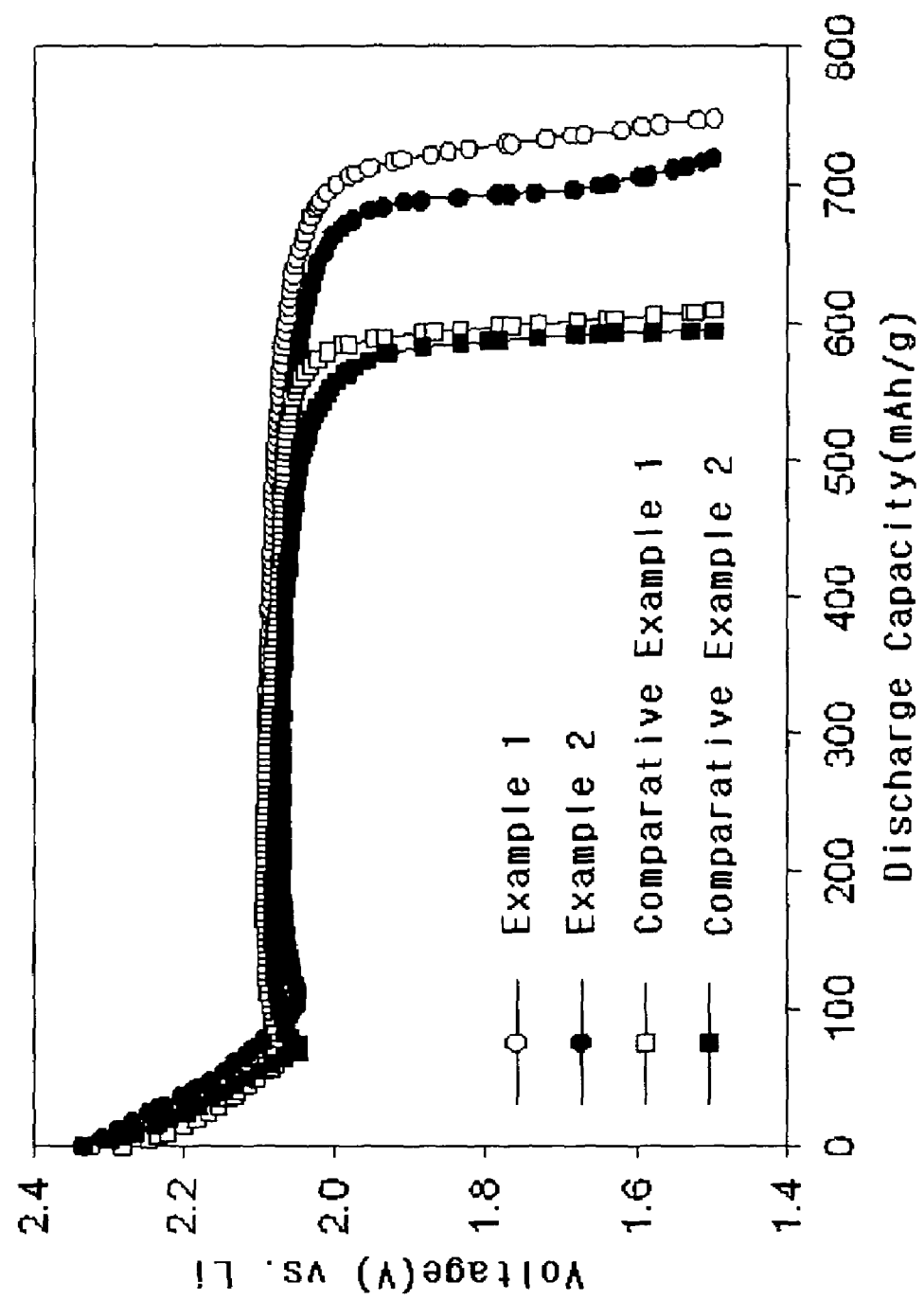
FIG. 1 is a graph illustrating charge and discharge characteristics of the lithium-sulfur cells according to Examples 1 and 2 of the present invention and Comparative Examples 1 and 2.

The present invention is directed to a binder for a lithium-sulfur battery that exhibits good adherence to positive active materials and to a current collector or electrode. An advantage of the present invention is to provide a binder for a lithium-sulfur battery having no solubility to an electrolyte, and good resistance to chemicals. It is still another advantage to provide a positive active material composition for a lithium-sulfur battery that has a low binder content. It is still another advantage to provide a lithium-sulfur battery that includes the binder and exhibits a high capacity.

To achieve these and other advantages and in accordance with the purpose of the present invention, as embodied and broadly described, the present invention may include a binder for a lithium-sulfur battery wherein the binder comprises a butadiene-based copolymer.

In another aspect of the present invention, the present invention may include a positive active material composition for a lithium-sulfur battery including a positive active material comprising sulfur or a sulfur-based compound, a conductive agent, an organic solvent, a binder that includes a butadiene-based copolymer, and an agent for controlling viscosity. The binder may be present in the organic solvent in the form of emulsion, with a size of about 15 micrometers or less. In certain embodiments, the amount of the binder may range from about 2 to about 6 wt %, and may preferably range from about 2 to about 3 wt %.

In still another aspect of the present invention may include a lithium-sulfur battery including a positive electrode, a negative electrode, and an electrolyte, where the positive electrode includes a positive active material, a conductive agent, and a binder having a butadiene-based copolymer.

Additional features and advantages of the invention will be set forth in the following description which follows, and in part will be apparent from the description, or may be learned by practice of the invention. The advantages of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

Reference will now be made in detail to an embodiment of the present invention, example of which is illustrated in the accompanying drawings. The present invention relates to a binder for a lithium-sulfur battery, where the binder includes a butadiene-based copolymer. The binder is a non-aqueous material, preferably distributed in an organic solvent in the form of emulsion.

The butadiene-based copolymer is a copolymer or modified copolymer formed from the polymerization of butadiene with one or more polymerization reagents, such as other monomers, dimers, and oligimers, which results in a copolymer that preferably exhibits chemical resistance to polysulfides, relative stability at battery working temperatures, is capable of being dispersed in organic solvents, and adheres to positive active materials containing sulfur.

In accordance with certain embodiments of the present invention, the butadiene-based copolymer is preferably acrylonitrile-butadiene-styrene copolymer, acrylonitrile-butadiene copolymer, or a modified styrene-butadiene copolymer. In certain embodiments, the modified styrene-butadiene copolymer may be carboxylated styrene-butadiene copolymer. The copolymer is generally presented in the form of rubber. An exemplary copolymer that may be used in the present invention is represented by the following Formula 1.

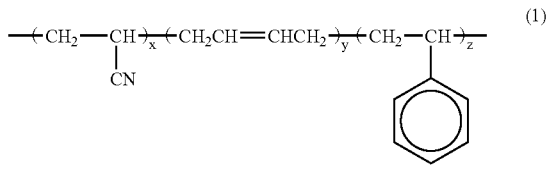

The "—(CH$_2$CH═CHCH$_2$)—" unit at the center portion of Formula 1 typically imparts rubber-like characteristics to the copolymer, and the "—(CH$_2$—CHCN)—" and "—(CH$_2$—CHC$_6$H$_5$—)" units impart glass-like characteristics to the copolymer. Preferably, the copolymer has a structure where two of x, y, and z cannot be zero. If two of x, y, and z are zero, the resulting polymer typically exhibits relatively poor mechanical properties. In the present invention, the preferred x, y, and z values depend on the type of copolymer used. If a styrene butadiene-based copolymer is used, x is zero, y preferably ranges from about 5 to about 40, and z preferably ranges from about 60 to about 95. If an acrylonitrile butadiene-based copolymer is used, x preferably ranges from about 60 to about 95, y preferably ranges from about 5 to about 40, and z is zero. If an acrylonitrile butadiene styrene-based polymer is used, x preferably ranges from about 20 to about 75, y preferably ranges from about 5 to about 20, and z preferably ranges from about 20 to about 75. If the x, y, and z values exceed the above preferred ranges, the binder will typically display inappropriate mechanical properties.

In another embodiment of the present invention, the binder for the lithium-sulfur battery may further include a fluorine-based polymer. The fluorine-based polymer helps to improve adhesion and to control swelling. As will be discussed in more detail below, the fluorine-based polymer may be a homopolymer that consists of the same repeat units or copolymer where the polymer has two or more different repeat units. An exemplary fluorine-based polymer that may be used in the present invention is represented by the following Formula 2:

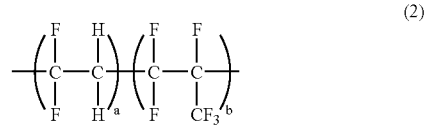

In certain embodiments, a may range from about 0.5 to about 1.0, and more preferably range from about 0.8 to about 1.0 and b may range from about 0 to about 0.5, and more preferably range from about 0 to about 0.2.

In other embodiments, the fluorine-based polymer may be a homopolymer composed of a monomer selected from the group consisting of C$_2$F$_3$C$_1$, C$_2$H$_3$F, and CH$_3$(CF$_3$C$_2$H$_4$)SiO. Further, the fluorine-based polymer may be a copolymer composed of a first monomer selected from the group consisting of C$_2$F$_4$, C$_2$F$_3$Cl, CH$_2$CF$_2$, C$_2$H$_3$F, and CH$_3$(CF$_3$C$_2$H$_4$)SiO, and a second monomer selected from the group consisting of C$_2$H$_4$, C$_3$H$_6$, CH$_2$═CHOR (where R is a C$_1$ to C$_{20}$ alkyl group), C$_3$F$_6$, and CF$_2$═CFOR$_f$ (R$_f$ includes at least 1 fluorine atom and is preferably a C$_1$ to C$_{20}$ alkyl group with at least 1 and preferably 1 to about 60 fluorine atoms).

If the binder uses both a butadiene-based copolymer and a fluorine-based polymer, the ratio of butadiene-based copolymer to fluorine-based polymer may range from about 10% butadiene-based copolymer to about 90% fluorine-based polymer by weight to a ratio of about 90% butadiene-based copolymer to about 10% fluorine-based polymer by weight.

The binder may be included in a positive active material composition. The positive active material composition preferably includes a positive active material, a conductive material, an organic solvent, and an agent for controlling viscosity. The binder is preferably distributed in the organic solvent in the form of an emulsion having a particle size of 15 micrometers or less. Conventional binders are typically presented in the organic solvent in a dissolved state, whereas in certain preferred embodiments, the binder of the present invention is distributed in the organic solvent. The positive active material particles, to be discussed below, more firmly adhere to each other via the distributed binder particles than with a dissolved binder. The adhesion increases as the size of the binder particle becomes smaller. Preferably, the size of the binder particle is about 15 micrometers or less.

Conventional binders are typically present in positive active material compositions in an amount of about 20% by weight. The good adhesion characteristics of the binder of the present invention permits a decrease in the amount of binder used in the positive active material composition when compared to conventional binders. In certain embodiments, the binder ranges from about 2 to about 6% by weight of the positive active material composition, and preferably ranges from about 2 to about 3% by weight of the positive active material composition. The decreased amount of the binder allows for an increase in the amount of the positive active material in the composition, which results in high capacity lithium-sulfur batteries.

The positive active material composition of the present invention preferably includes an agent for controlling viscosity to offset the decrease in viscosity of the positive active material composition.

The agent for controlling viscosity may include a cellulose-based polymer such as methyl cellulose, hydroxypropyl methylcellulose, hydroxyethyl-cellulose, or carboxymethyl cellulose. Further, the agent for controlling viscosity may include polyvinyl alcohol, polyvinylpyrrolidone, polyacrylic acid, polyacrylamide, polyethyleneoxide, or polyethyleneimine. In certain embodiments, the amount of the agent for controlling viscosity preferably ranges from about 0.1% to about 10% by weight of the positive active material composition. If the amount of the agent is less than about 0.1% by weight of the positive active material composition, the viscosity of the positive active material composition may be too low to coat on a current collector. If the amount of the agent is more than about 10% by weight of the positive active material composition, the relative amount of the positive active material is reduced, thereby decreasing the capacity of the battery.

The positive active material used in the positive active material composition may include, but is not limited to, elemental sulfur ($S_8$), $Li_2S_n$ (where $n \geq 1$), an organic-sulfur compound, or a carbon-sulfur polymer [$(C_2S_x)_n$, where x ranges from about 2.5 to about 50 and $n \geq 2$].

The conductive material used in the positive active material composition includes an electrical conductor that facilitates the movement of electrons within the positive electrode with the sulfur-based compound. Examples of the conductive material include, but are not limited to, a graphite-based material, a carbon-based material, and a conductive polymer. The graphite-based material includes, but is not limited to, KS 6 (available from Timcal Co.); and the carbon-based material includes, but is not limited to, Super P (available from MMA Co.), ketjen black, denca black, acetylene black, or carbon black. The conductive polymer may include, but is not limited to, polyaniline, polythiophene, polyacetylene, polypyrrole, or a combination thereof. The amount of the conductive material preferably ranges from about 5% to about 20% by weight, and thus the amount of the positive active material increases to a maximum of 92.9% by weight which results in an increase in capacity of the resulting battery.

The organic solvent used in the positive active material composition may be any solvent as long as it is capable of homogeneously dispersing the positive active material, the binder, and the conductive material. According to certain embodiment, useful solvents include, but are not limited to acetonitrile, methanol, ethanol, tetrahydrofurane, water, isopropyl alcohol, and dimethyl formamide.

The preparation of a positive electrode using the compositions of the present invention will be illustrated below.

The binder containing the butadiene-based copolymer is dispersed in the organic solvent to prepare a binder liquid.

A conductive material and positive active material are added to the binder liquid and mixed for at least about 12 hours to prepare a positive active material composition. The resulting positive active material composition in accordance with the present invention has a viscosity sufficient to coat a current collector.

The positive active material composition is coated on a current collector and dried to produce a positive electrode.

The material for the current collector is not limited, but is preferably made of a conductive material such as stainless steel, aluminum, copper, or titanium. In certain preferred embodiments, the current collector is a carbon-coated aluminum current collector. The carbon-coated aluminum current collector exhibits excellent adhesive properties to the positive active material composition. Further, the carbon-coated aluminum current collector exhibits a lower contact resistance than a bare aluminum current collector and also inhibits corrosion by a polysulfide compared to a bare aluminum current collector.

Using the positive electrode, a negative electrode, and an electrolyte, a lithium-sulfur battery is fabricated by general procedures known to those skilled in the art.

Typically, the negative electrode includes a negative active material selected from a lithium metal or a lithium alloy such as lithium/aluminum.

In addition, during charging and discharging of the lithium-sulfur battery, the positive active material (active sulfur) converts to an inactive material (inactive sulfur), which can attach to the surface of the negative electrode. The term "inactive sulfur", as used herein, refers to sulfur that has no activity upon repeated electrochemical and chemical reactions such that it cannot participate in an electrochemical reaction with the positive electrode. The inactive sulfur on the surface of the negative electrode acts as a protective layer for the lithium negative electrode. Accordingly, inactive sulfur, for example lithium sulfide, on the surface of the negative electrode can be used in the negative electrode.

The following examples illustrate the present invention in further detail, but it is understood that the present invention is not limited by these examples.

EXAMPLE 1

84 wt % of elemental sulfur ($S_8$), 12 wt % of ketjen black (Mitsubishi), 2 wt % of an acrylonitrile butadiene styrene copolymer binder, and 2 wt % of carboxymethyl cellulose as an agent for controlling viscosity were uniformly mixed in a water solvent to prepare a slurry.

The slurry was coated on a carbon-coated Al current collector and the coated current collector was dried to produce a positive electrode.

Using the positive electrode, a lithium foil negative electrode, a polypropylene separator, and an electrolyte, a lithium-sulfur cell was fabricated in a dry room. The electrolyte was 1M $LiSO_3CF_3$ in a mixed solvent of 1,3-dioxolane/diglyme/sulforane/dimethoxy ethane (5:2:1:2 volume ratio).

EXAMPLE 2

84 wt % of elemental sulfur ($S_8$), 12 wt % of ketjen black (Mitsubishi), 1 wt % of a fluorine-based binder represented by Formula 2, 1 wt % of an acrylonitrile butadiene styrene copolymer binder, and 2 wt % of carboxymethyl cellulose as an agent for controlling viscosity were uniformly mixed in a water solvent to prepare a slurry.

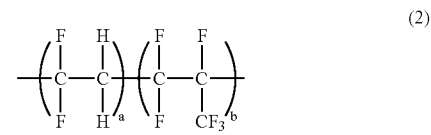

(2)

(wherein a is 0.85, and b is 0.15)

The slurry was coated on a carbon-coated Al current collector and the coated current collector was dried to produce a positive electrode.

Using the positive electrode, a lithium foil negative electrode, a polypropylene separator, and an electrolyte, a lithium-sulfur cell was fabricated in a dry room. The electrolyte was 1M $LiSO_3CF_3$ in a mixed solvent of 1,3-dioxolane/diglyme/sulforane/dimethoxy ethane (5:2:1:2 volume ratio).

COMPARATIVE EXAMPLE 1

60 wt % of elemental sulfur ($S_8$), 20 wt % of ketjen black (Mitsubishi), and 20 wt % of polyethyleneoxide were uniformly mixed in an acrylonitrile solvent to prepare a slurry.

The slurry was coated on a carbon-coated Al current collector and the coated current collector was dried to produce a positive electrode.

Using the positive electrode, a lithium foil negative electrode, a polypropylene separator, and an electrolyte, a lithium-sulfur cell was fabricated in a dry room. The electrolyte was 1M LiSO₃CF₃ in a mixed solvent of 1,3-dioxolane/diglyme/sulforane/dimethoxy ethane (5:2:1:2 volume ratio).

COMPARATIVE EXAMPLE 2

60 wt % of elemental sulfur (S₈), 20 wt % of ketjen black (Mitsubishi) and 20 wt % of polyvinylpyrrolidone were uniformly mixed in an acrylonitrile solvent to prepare a slurry.

The slurry was coated on a carbon-coated Al current collector and the coated current collector was dried to produce a positive electrode.

Using the positive electrode, a lithium foil negative electrode, a polypropylene separator, and an electrolyte, a lithium-sulfur cell was fabricated in a dry room. The electrolyte was 1M LiSO₃CF₃ in a mixed solvent of 1,3-dioxolane/diglyme/sulforane/dimethoxy ethane (5:2:1:2 volume ratio).

The charge and discharge characteristics of the cells according to Examples 1 and 2 and Comparative Examples 1 and 2 were measured at room temperature. The lithium-sulfur battery was initially discharged for 1 cycle at a discharging current density of 0.2 mA/cm², since the test cell had been charged on cell formation. Thereafter, a charge current density was set to 0.4 mA/cm² and the discharge current density was set to 0.2 mA/cm² (C-rate was 0.1 C). The discharge cut-off voltage was set to 1.5~2.8 V. The results are presented in FIG. 1. As illustrated in FIG. 1, although the discharge average voltages of the cells according to Examples 1 and 2 were similar to those according to Comparative Examples 1 and 2, the capacity per gram of electrode of the cells according to Examples 1 and 2 was higher than in Comparative Examples 1 and 2.

Cycle Life Characteristics

Figure 2:
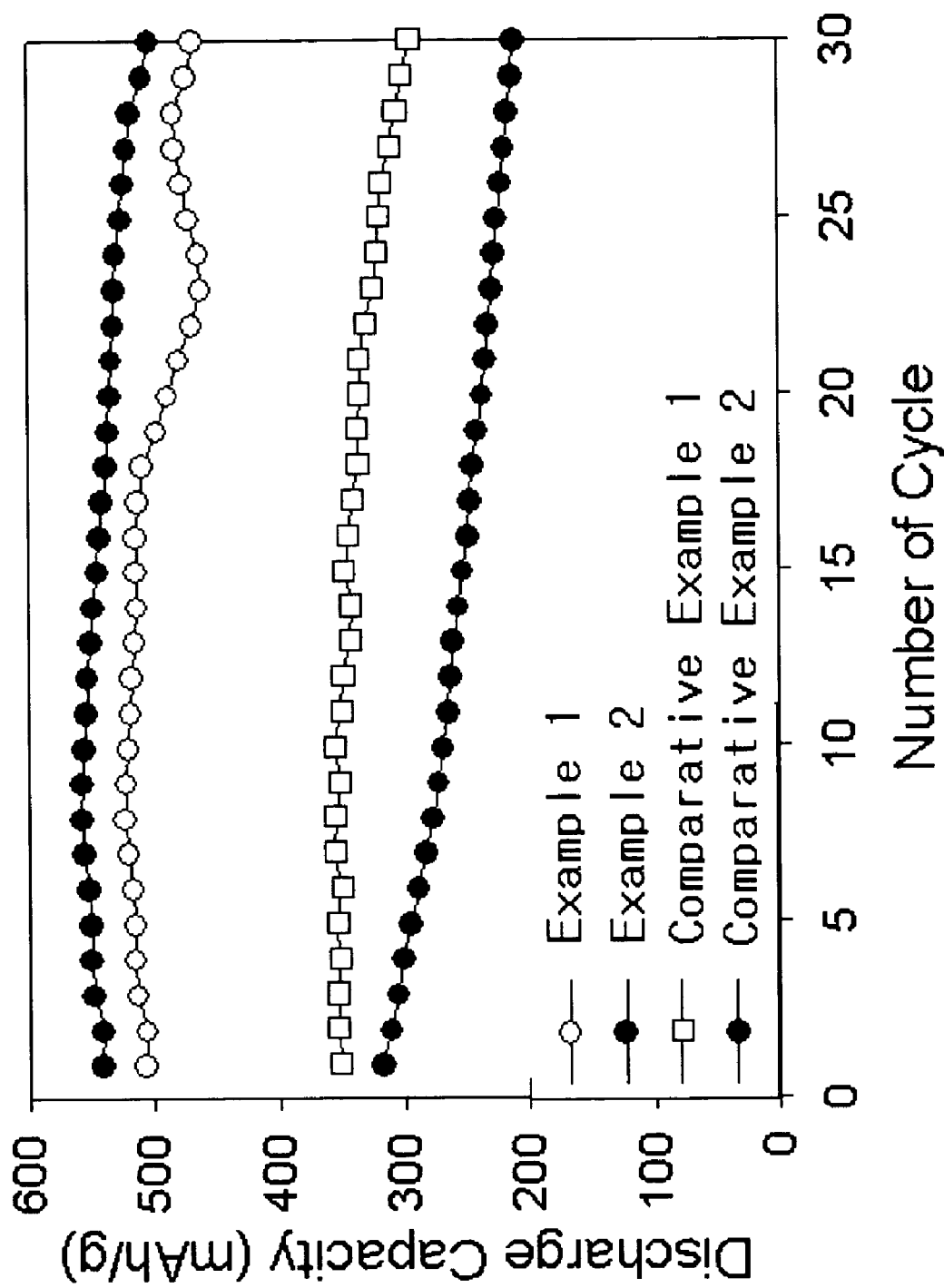
FIG. 2 is a graph illustrating cycle life characteristics of the lithium-sulfur cells according to Examples 1 and 2 of the present invention and Comparative Examples 1 and 2.

The cycle life characteristics of the cells according to Examples 1 and 2 and Comparative Examples 1 and 2 were measured at room temperature. The charge current density was set to 0.4 mA/cm² (C-rate: 0.5C) and the discharge current density was set to 2 mA/cm² (C-rate: 1.0 C). The results are presented in FIG. 2. It is evident from FIG. 2 that the cells according to Examples 1 and 2 have surprisingly higher capacities than that for Comparative Example 1. These higher capacities are maintained during 30 charge and discharge cycles.

As described above, the binder of the present invention exhibits good adhesion to the positive active material. Such good adhesion permits an increase in the amount of the positive active material (84 wt % in Examples 1 and 2 compared to 60 wt % for the Comparative Example. The increased amount of the positive active material results in providing high capacity lithium-sulfur batteries.

While this invention has been described in connection with what is presently considered to be the most practical and preferred embodiments, it is to be understood that the invention is not limited to the disclosed embodiments. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A positive active material composition for a lithium-sulfur battery, comprising:

a positive active material comprising sulfur or a sulfur-based compound;
a conductive agent;
an organic solvent;
a binder comprising a butadiene-based copolymer, wherein the binder is distributed in the organic solvent to form an emulsion, the binder having particle sizes of 15 micrometers or less; and
an agent for controlling viscosity.

2. The positive active material composition of claim 1, wherein the binder is presented in the amount of 2 to 6% by weight of the positive active material composition.

3. The positive active material composition of claim 2, wherein the binder is presented in the amount of 2 to 3% by weight of the positive active material composition.

4. The positive active material composition of claim 1, wherein the butadiene-based copolymer is selected from the group consisting of an acrylonitrile-butadiene-styrene copolymer, an acrylonitrile-butadiene copolymer, and a modified styrene-butadiene copolymer.

5. The positive active material composition of claim 4, wherein the butadiene-based copolymer is selected from the group consisting of an acrylonitrile-butadiene-styrene rubber, an acrylonitrile-butadiene rubber, and a modified styrene-butadiene rubber.

6. The positive active material composition of claim 1, wherein the butadiene-based copolymer is represented by Formula 1:

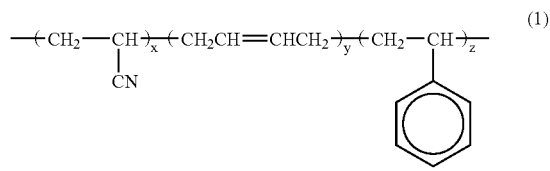

and wherein:
when x is 0, y ranges from about 5 to about 40, and z ranges from about 60 to about 95;
when z is 0, x ranges from about 60 to about 95 and y ranges from about 5 to about 40; and
when x, y, and z do not equal 0, x ranges from about 20 to about 75, y ranges from about 5 to about 20, and z ranges from about 20 to about 75.

7. The positive active material composition of claim 1, wherein the butadiene-based copolymer is non-aqueous.

8. The positive active material composition of claim 1, further comprising a fluorine-based polymer.

9. The positive active material composition of claim 8, wherein the fluorine-based polymer is represented by Formula 2:

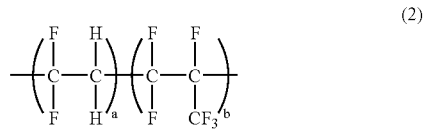

and wherein a ranges from about 0.5 to about 1.0, and b ranges from about 0 to about 0.5.

10. The positive active material composition of claim 8, wherein the fluorine-based polymer is selected from the group consisting of a homopolymer prepared from monomers selected from the group consisting of $C_2F_3Cl$, $C_2H_3F$ and $CH_3(CF_3C_2H_4SiO)$, and a copolymer including a first monomer and a second monomer, wherein the first monomer is selected from the group consisting of $C_2F_4$, $C_2F_3Cl$, $CH_2CF_2$, $C_2H_3F$ and $CH_3(CF_3C_2H_4)SiO$, and the second monomer is selected from the group consisting of $C_2H_4$, $C_3H_6$, $CH_2$=CHOR where R is a $C_1$ to $C_{20}$ alkyl group, $C_3F_6$ and $CF_2$=CFORf where Rf is a $C_1$ to $C_{20}$ alkyl group with at least one fluorine atom.

11. The positive active material composition of claim 1, wherein the agent for controlling viscosity is selected from the group consisting of a cellulose-based polymer, polyvinyl alcohol, polyvinylpyrrolidone, polyacrylic acid, polyacrylamide, polyethyleneoxide, and polyethyleneimine.

12. The positive active material composition of claim 11, wherein the cellulose-based polymer is selected from the group consisting of methyl cellulose, hydroxypropyl methylcellulose, hydroxyethyl-cellulose, or carboxymethyl cellulose.

* * * * *